Jan. 7, 1964  P. B. CAMPBELL  3,116,599
STARTER FOR ROCKET MOTOR
Filed Feb. 26, 1962
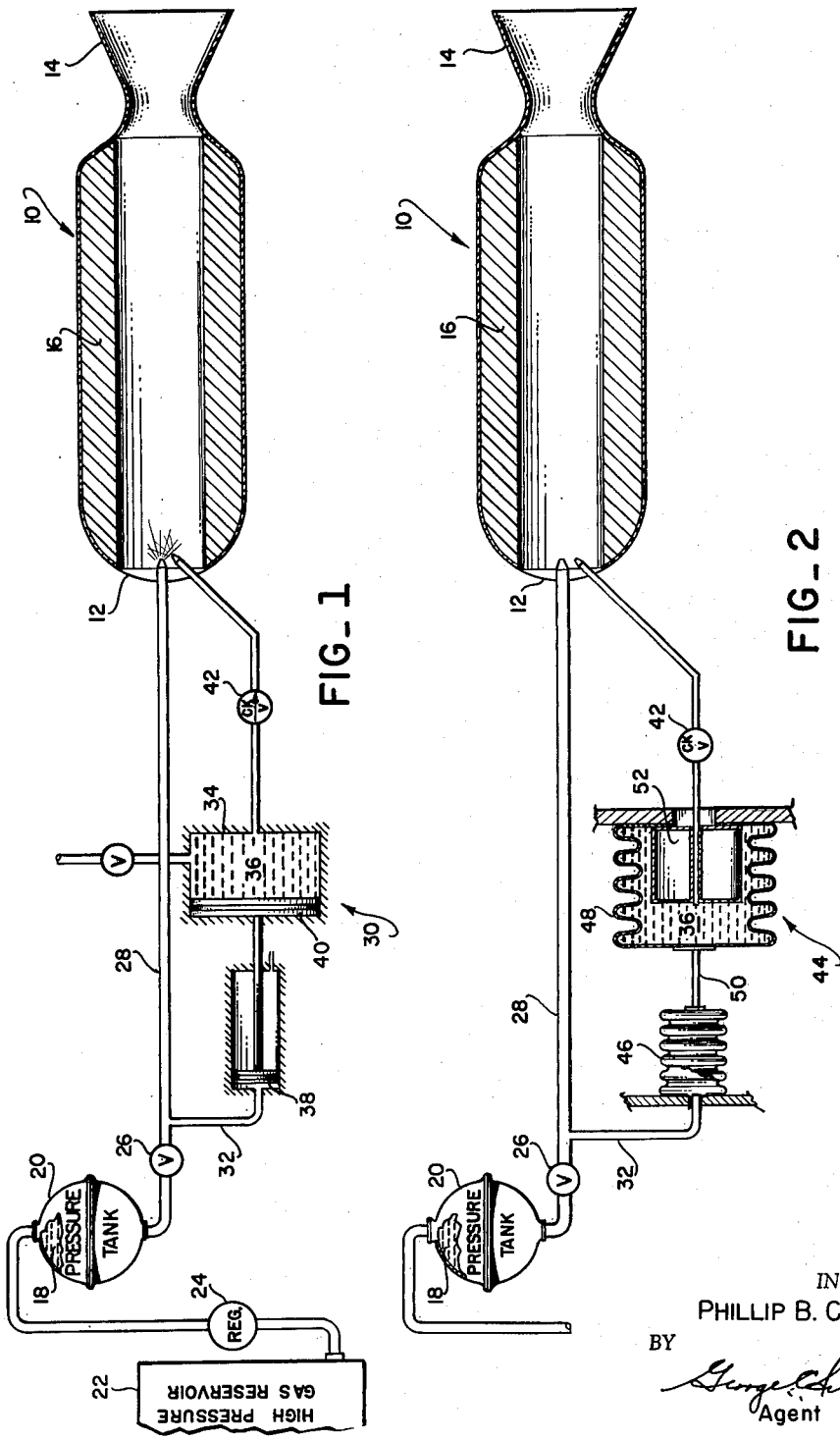
INVENTOR.
PHILLIP B. CAMPBELL
BY
*George C. Sullivan*
Agent

United States Patent Office 3,116,599
Patented Jan. 7, 1964

3,116,599
STARTER FOR ROCKET MOTOR
Phillip B. Campbell, Redlands, Calif., assignor, by mesne assignments, to Lockheed Aircraft Corporation, Burbank, Calif., a corporation of California
Filed Feb. 26, 1962, Ser. No. 175,505
5 Claims. (Cl. 60—35.6)

This invention relates to a starter for a hybrid propellant rocket motor and more particularly to such a starter having capability for repeated starts.

A hybrid propellant rocket comprises a solid grain, usually fuel rich, contained in a thrust chamber or motor and a combustion sustaining fluid, generally an oxidizer, which is injected continuously into the chamber from an external source during motor operation. These solid grains may comprise a hydrocarbon fuel such as a synthetic rubber or polyethylene along with varying amounts of metal additives and solid oxidizer in the form of perchlorates, nitrates, and the like. The injected fluids may comprise such oxidizers as nitrogen tetroxide, fuming acid, hydrogen peroxide, and the like. However, in some hybrid rockets, the so-called inverse hybrid rockets, the solid grain may consist principally of an oxidizer and the injected fluid may consist of a liquid fuel. Thus, the terms "solid grain" and "fluid" as hereinafter used are intended to be applicable to either type of hybrid system, unless otherwise indicated. Also, it is to be understood that the solid grain and fluid are non-hypergolic; that is, they do not spontaneously ignite upon contact.

In these non-hypergolic hybrid rockets, a starter is necessary to ignite the propellants and start combustion in the thrust chamber. Combustion will continue as long as the fluid is being injected into the chamber. However, in certain applications such as space travel, it is desirable that combustion be temporarily stopped by shutting off sustaining fluid flow and then have it re-started. In these applications, a starter capable of repeatedly starting combustion is desired.

Accordingly, it is a general object of the present invention to provide a repeating starter for a non-hypergolic hybrid rocket.

A more particular object of the present invention is to provide a repeating starter which will automatically become operative as soon as the fluid is injected into the chamber and which will become inoperative when combustion starts and a pre-determined chamber pressure is reached.

Another object of the present invention is to utilize a starter containing a starting fluid which is hypergolic, or spontaneously ignitable, with the injection fluid. By use of such a fluid, a very simple and reliable starter is provided which does not rely on electrical firing means, pyrotechnic trains, or other additional equipment to start ignition.

These and other objects of the present invention will become more apparent from the following detailed description of the accompanying drawing in which:

FIGURE 1 is a schematic drawing of one embodiment of the present starter; and

FIGURE 2 is a schematic drawing of another embodiment of the present starter.

In FIGURE 1, thrust chamber or motor 10 has a domeshaped forward portion 12 and a nozzle portion 14. The chamber carries a hybrid solid propellant grain 16 which may consist of any of the known types of propellants. The injection fluid 18 is stored in tank 20 which is pressurized by high pressure gas flowing from reservoir 22 through regulator 24. Control valve 26 of the servo type in main fluid line 28 regulates flow of fluid 18 into the forward portion of the thrust chamber. As previously mentioned, the injection fluid is non-hypergolic with the solid propellant grain and consists of any fluid which will sustain combustion of the grain. For illustrative purposes, the injection pressure in line 28 may vary from 500 to 2000 pounds per square inch, depending upon the rate of combustion desired and the grain-fluid combination used.

The present starter, represented generally at 30, includes a fluid line 32 which is connected at one end to the main line 28 and at the other end to a differential force mechanism. The latter is actuated by the injection pressure in the main line and is effective to drive a starting fluid 36 contained in a reservoir 34 into the forward portion 12 of the motor under reduced pressure. Starting fluid 36 is hypergolic with fluid 18 and therefore produces a flame upon contact with fluid 18, which ignites motor 10. For exemplary purposes, fluid 18 may be nitrogen tetroxide and fluid 36 may be unsymmetrical dimethyl hydrazine.

In FIGURE 1, the differential force transferring mechanism consists of two interconnected piston means. The upstream power piston 38 is smaller in diameter than the downstream pump piston 40. Thus, if the ratio of the areas of the pistons should be 1 to 7.5 and the injection pressure in line 28 should be 1500 pounds per square inch, the pressure at the reservoir 34 will be 200 pounds per square inch. This reduced pressure is necessary so that flow of the starting fluid will cease automatically when the motor ignites and the chamber pressure builds up to exceed that of the starter fluid. Once ignition is accomplished, a check valve 42 in the secondary fluid line prevents flow of the starting fluid and isolates the starter from the chamber. By use of the fluid injection pressure and the differential force transferring mechanism, a separate pressurization system is not necessary for the present starter.

In operation, when control valve 26 is opened, fluid 18 is admitted into lines 28 and 32. As previously explained, the injection fluid pressure acting on the piston means forces starting fluid 36 into the motor where it comes into contact with fluid 18. The hypergolicity of the two fluids produce a flame which ignites grain 16. When grain ignition takes place and the resulting chamber pressure exceeds that of the starter fluid, check valve 42 will close to stop further flow of the starting fluid into the motor. By providing sufficient starting fluid in reservoir 34, as many re-starts as desired may be accomplished with the described starter.

The starter shown in FIGURE 2 is similar in structure and operation to the starter shown in FIGURE 1, except that the differential force transfer mechanism here consists of two interconnected bellow means shown generally at 44. The upstream power bellows 46 has a smaller diameter than downstream pump bellows 48. Bellows 48 serves as the reservoir for starting fluid 36. As in the embodiment shown in FIGURE 1, the two bellows are designed to give a predetermined reduction in pressure in the starting fluid reservoir, the reduction being equivalent to the ratio of the end areas of the respective bellows.

In operation, the main injection fluid 18 from tank 20 exerts pressure on bellows 46, expanding it and transmitting a force to bellows 48 through link 50. The force causes bellows 48 to contract and thereby discharge fluid 36 into the motor. Upon contact of fluids 18 and 36 in the motor, a flame is produced which in turn ignites the grain. When the chamber pressure exceeds that of the starter fluid, check valve 42 will close to stop further flow of the starting fluid into the motor. By providing sufficient starting fluid in bellows 48, as many re-starts as desired may be accomplished with the starter. In order to reduce the amount of starting fluid left in bellows 48 after full contraction, a space filler 52 may be provided in the bellows.

Although certain specific construction details and operating conditions have been given for illustrative purposes, it is to be understood that the scope of the present invention is to be limited only by the appended claims.

I claim:

1. In combination with a hybrid propellant rocket motor having a solid grain, an external source of a fluid component, said component being non-hypergolic with said grain, and means for injecting said component under pressure into the motor; a repeating motor ignition starter comprising: a reservoir containing a starting fluid, said fluid being hypergolic with said component; a differential force transferring mechanism for injecting a portion of the starting fluid into the motor and igniting said motor by contact of said fluid with said component, said mechanism being connected to the component injection means and being actuated thereby simultaneously with the flow of said component, said mechanism being further adapted to inject said portion of the starting fluid into the motor at a lower pressure than the component pressure and to stop said injection of starting fluid when the motor ignites and the pressure therein exceeds the aforementioned lower pressure.

2. In combination with a hybrid propellant rocket motor having a solid grain, an external source of a fluid component, said component being non-hypergolic with said grain, and means for injecting said component under pressure into the motor; a repeating motor ignition starter comprising: a reservoir containing a starting fluid, said fluid being hypergolic with said component; a differential force transferring mechanism for injecting a portion of the starting fluid into the motor and igniting said motor by contact of said fluid with said component, said mechanism comprising a power piston means connected to the component injection means and being actuated thereby simultaneously with the flow of said component, a pump piston means interconnected with said power piston means, and adapted to act upon said starting fluid for injection into said motor, said pump piston means having a larger cross sectional area than said power piston means so that the starting fluid is injected into the motor at a proportionately reduced pressure; and check valve means for terminating starting fluid injection when the motor ignites and the pressure therein exceeds said reduced pressure.

3. In combination with a hybrid propellant rocket motor having a solid grain, an external source of a fluid component, said component being non-hypergolic with said grain, and means for injecting said component under pressure into the motor; a repeating motor ignition starter comprising: a starting fluid, said fluid being hypergolic with said component; a differential force transferring mechanism for injecting a portion of the starting fluid into the motor and igniting said motor by contact of said fluid with said component, said mechanism comprising a power bellows means connected to the component injection means and being expandable simultaneously with the flow of said component, a pump bellows means containing said fluid and being contractable by the expansion of the power bellows means to inject said portion of the starting fluid into the motor, said pump bellows means having a larger end area than said power bellows means so that the starting fluid is injected into the motor at a proportionately reduced pressure; and check valve means for terminating starting fluid flow when the motor ignites and the pressure therein exceeds said reduced pressure.

4. In combination with a hybrid propellant rocket motor having a rubber base propellant grain, an external source of nitrogen tetroxide, means for injecting said nitrogen tetroxide under pressure into the motor; a repeating motor ignition starter comprising: a reservoir containing a starting fluid comprising unsymmetrical dimethyl hydrazine, a differential force transferring mechanism for injecting a portion of said starting fluid into the motor and igniting said motor by contact of the starting fluid with the nitrogen tetroxide, said mechanism being connected to the means for injecting the nitrogen tetroxide and being actuated thereby simultaneously with the flow of the nitrogen tetroxide, said mechanism being further adapted to inject said portion of the starting fluid into the motor at a lower pressure than that of the nitrogen tetroxide and to stop said injection of starting fluid when the motor ignites and the pressure therein exceeds the above-mentioned lower pressure.

5. A starter according to claim 3, wherein the pump bellows means contains a space filler to reduce the unswept volume of the bellows.

References Cited in the file of this patent

UNITED STATES PATENTS

| | | |
|---|---|---|
| 1,163,541 | Hultin | Dec. 7, 1915 |
| 1,805,802 | Browne | May 19, 1931 |
| 2,864,233 | Tschinkel | Dec. 16, 1958 |
| 2,897,649 | Reddy | Aug. 4, 1959 |
| 2,939,278 | Fox | June 7, 1960 |
| 2,974,484 | Cooley | Mar. 14, 1961 |
| 2,984,973 | Stegelman | May 23, 1961 |
| 3,017,748 | Burnside | Jan. 23, 1962 |